United States Patent [19]

Struss

[11] Patent Number: 4,657,594

[45] Date of Patent: Apr. 14, 1987

[54] LIGHTWEIGHT JOINT COMPOUND

[75] Inventor: Arthur W. Struss, Libertyville, Ill.

[73] Assignee: USG Corporation, Chicago, Ill.

[21] Appl. No.: 752,268

[22] Filed: Jul. 5, 1985

[51] Int. Cl.[4] .............................................. C04B 14/18
[52] U.S. Cl. ........................ 106/308 N; 106/DIG. 2;
   106/109; 106/110; 106/111; 106/112; 106/113;
   106/114; 106/115; 521/57; 523/209; 523/212;
   524/43; 524/44; 524/47; 524/268
[58] Field of Search ..... 106/308 N, DIG. 2, 109–115;
   521/57; 523/209, 212; 524/43, 44, 47, 268

[56] References Cited

U.S. PATENT DOCUMENTS

| | | | |
|---|---|---|---|
| Re. 29,753 | 9/1978 | Williams | 106/85 |
| 3,297,601 | 1/1967 | Maynard | 524/53 |
| 4,454,267 | 6/1984 | Williams | 524/43 |

*Primary Examiner*—Amelia B. Yarbrough
*Attorney, Agent, or Firm*—Samuel Kurlandsky; Robert M. Didrick; Robert H. Robinson

[57] ABSTRACT

Expanded perlite coated with an amino-functional siloxane and a silicone wetting agent, and a joint compound incorporating same, which, when applied to gypsum wallboard, has improved bonding properties and greater uniformity in paint gloss appearance between the surface of the joint compound and the surface of the wallboard.

20 Claims, No Drawings

LIGHTWEIGHT JOINT COMPOUND

BACKGROUND OF THE INVENTION

1. Field of the Invention

The present invention relates to a joint compound for use in filling and coating the joints between adjacent gypsum wallboards, and more particularly refers to a joint compound of the type described which is light weight, is readily sandable, has lower shrinkage, provides a reduction in transportation costs because of its lightweight, and provides additional improved properties such as better adhesion and improved paintability than prior art lightweight joint compounds.

In the construction of buildings, one of the most common elements is gypsum wallboard, often known as "drywall", used to construct the walls and/or ceilings. Walls made from gypsum wallboard are conventionally constructed by affixing the wallboard panels to studs or joists, and filling and coating the joints between panels with a specially prepared adhesive called a "joint compound". This process generally proceeds in the following fashion: a taping grade joint compound is placed within the joint formed by the abutted edges of the wallboards, and a liquid-permeable tape is embedded within the taping compound. When dry (or set), a second coating comprising a topping grade joint compound is applied over the joint. This may be sanded lightly, and then a third coat applied and conventionally finished. Another grade of joint compound is an all-purpose grade which may be used, as the name suggests, both for embedding the tape and for applying as a finishing coat. In some instances, a patterned effect is given to the finished wall and joint with the all-purpose joint compound to provide a textured finish.

The primary difference in the past between the various grades of joint compounds has been in the amounts of each ingredient utilized. Thus, no matter what the grade, joint compounds invariably include a filler and a binder. More binder is used for the taping grade than for the topping grade. Typical fillers may be calcium carbonate, calcium sulfate hemihydrate, or calcium sulfate dihydrate. When calcium sulfate hemihydrate is used, a setting-type joint compound is formed. An Example of a setting-type joint compound is disclosed in U.S. Pat. No. 3,297,601. When calcium carbonate or calcium sulfate dihydrate is utilized as a filler, the joint compound is a drying-type and must utilize a binder such as Polyvinyl acetate to provide cohesion among the particles and adhesion to the wallboard paper.

In U.S. Pat. No. Re. 29,753, joint compounds are disclosed which are free of asbestos and utilize attapulgus clay to provide the nonleveling properties previously obtained by the use of asbestos fibers. Conventional compounds with or without attapulgus clay have proven to be excellent. However, these joint compounds are quite heavy and expensive to transport and heavy to carry by the workmen. Additionally, when conventional joint compounds dry, they acquire a hard texture and are difficult to sand in order to provide the joint with a smooth surface. It would be desirable to have a joint compound which is of lighter weight than conventional joint compounds, shrinks less, and which, when dry, can be readily sanded to provide a smooth surface.

In U.S. Pat. No. 4,454,267 a novel joint compound is disclosed and claimed comprising expanded perlite treated with a silicone polymer as one of the components to cause a substantial reduction in the density of the joint compound, with the resulting reduction in the cost of transportation and ease of working with the material. The joint compound disclosed in this patent was found to be very well suited for use in construction. However, in order to provide sufficient adhesion to wallboard paper tape and paper cover sheets, it was found to be necessary to use up to twice as much binder as was used in prior joint compounds. Additionally, it was found that, because of the high impermeability with respect to water, there resulted a considerable gloss difference between paint applied over the joint compound and paint applied over the wallboard paper itself.

SUMMARY OF THE INVENTION

It is accordingly an object of the present invention to provide a joint compound which is free of asbestos.

It is a further object to provide a joint compound which has properties such as non-leveling, non-cracking and good adhesion generally required of a good joint compound.

It is still further an object to provide a joint compound which is substantially lighter in weight than conventional joint compounds, and which may therefore be transported at lower cost, and which may be more readily handled by workmen.

It is an additional object to provide a joint compound having excellent non-cracking, low shrinkage, and good adhesive properties.

It is still further an object to provide a joint compound having good adhesion to paper tape applied over the joint between wallboards and to the wallboard paper itself.

It is still an additional object to provide a joint compound which is readily wet by paint applied over the dried joint compound sufficient to reduce the dry gloss difference between paint applied over the joint compound and paint applied over the wallboard paper.

Other objects and advantages of the invention will become apparent upon reference to the following description.

According to the present invention a joint compound, exhibiting the properties described is provided by a formulation which comprises a conventional filler such as calcium carbonate, calcium sulfate dihydrate, or calcium sulfate hemihydrate, a conventional binder such as polyvinyl acetate, a non-leveling and slip providing material such as attapulgus clay, a water retention or thickening agent such as hydroxypropyl methylcellulose, and a specially treated expanded perlite. The presence of the perlite substantially reduces the density of the joint compound and reduces the cost of transportation. The perlite is treated with either a mixture of or a copolymer of an alkyl group-containing silane and an aminosilane, or with a copolymer of the two materials in the form of an amino-functional polysiloxane. This renders the perlite water-resistant, and additionally improves bonding between the joint compound and a paper tape or paper utilized as a cover sheet for the gypsum board. Additionally, some improvement in uniform paintability is achieved. To obtain the optimum in uniform paintability, the perlite is also treated with a silicone polymer wetting agent which further inproves uniformity of the painted surface between the area of the joint compound and the area of the paper cover sheets of the gypsum wallboard, and to prevent gloss differences when dry between the paint applied to the joint compound surface and the paint applied to the paper of the wallboard panel.

DESCRIPTION OF THE PREFERRED EMBODIMENTS

A joint compound suitable for use in construction must have certain properties which are provided by a number of conventional ingredients. The first necessary ingredient is a filler. Any common filler disclosed in the art may be utilized. A preferred filler is finely ground calcium carbonate. Other fillers which may be used are calcium sulfate dihydrate and calcium sulfate hemihydrate. In addition, mica, talc, pyrophylite, sericite, diatomaceous earth, and clays such as kaolinite may be used together with the primary fillers.

Another required ingredient of a joint compound is a non-leveling agent. A preferred non-leveling agent is attapulgus clay. Other nonleveling agents are mixtures of amylopectin starch together with various modified clays in a ratio by weight of about 5:1. Still other nonleveling agents which can be used are various bentonites. The nonleveling agents impart certain rheological properties to the joint compound such as thixotropy. It has been further found that the expanded perlite itself contributes to the desirable rheological properties to a considerable degree.

Still another material required in a joint compound is a thickener. Among the common thickeners are hydroxypropyl methylcellulose, methycellulose, hydroxyethylcellulose, hydroxyethyl methylcellulose, and sodium carboxymethylcellulose. The thickeners may be used alone or in combination with one another.

Another ingredient required of a joint compound, particularly in the case of a drying-type joint compound, is a binder. Among the preferred binders is polyvinyl acetate. Other binders which may be utilized are polyvinyl alcohol, ethylenevinyl acetate co-polymer, vinylacrylic co-polymer, styrenebutadiene, other acrylic polymers, and starch.

Additional ingredients which may be utilized in joint compounds are preservatives, wetting agents, defoamers, and plasticizers. In the examples the same basic joint compound formulation was utilized and is generally one which is similar to that disclosed in U.S. Pat. No. 4,454,267. The general formulation is disclosed in Table I below.

TABLE I

| FORMULATION DRY WEIGHT | |
|---|---|
| Material | Amount |
| Aminosiloxane Treated Expanded Perlite | 180 g |
| Calcium Carbonate | 707.7 g |
| Attapulgus Clay | 50 g |
| Hydroxypropyl Methylcellulose | 8 g |
| Polyvinyl Acetate | 55 g |
| Cosan 158 | 1.0 g |
| Troysan 174 | 1.0 g |
| Total Water | 780 ml |
| Density | 6.9 Lb/Gal. |
| Viscosity | 345 Bu. |

Although, as stated, a single general formulation was utilized, the formulation may be altered within the limits disclosed below in Table II, and as established in U. S. No. 4,454,267.

TABLE II

|  | Lower Limit | Upper Limit |
|---|---|---|
| Polyaminosiloxane Treated Perlite | 3.5% | 25% |
| Non-leveling Agent | 0.5% | 7% |
| Thickener | 0.3% | 1.8% |
| Binder | 0.5% | 10% |
| Fillers | 38% | 93% |

Of the trademarked materials listed above in Table I, "COSAN 158" is a fungicide marketed and manufactured by the Cosan Chemical Company. "TROYSAN 174" is a preservative manufactured and marketed by the Troy Chemical Company, and is utilized to preserve the joint compound.

All the joint compounds produced in the examples were subjected to the conventional tests utilized for determining the properties of joint compounds to determine whether they are suitable for such commercial use. Among the properties tested were ease of trowel application, hand sanding properties, cracking and fissure resistance, bonding to a liquid-permeable tape, edge delamination, resistance to deterioration under humid conditions, ease of mechanical sanding, shrinkage, shelf life, and freeze-thaw stability. Each of the joint compounds of the examples exhibited excellent properties in all the tests performed.

The ingredient of the present lightweight joint compound which results in a reduction in density of the joint compound is expanded and specially treated perlite. Perlite is a form of glassy rock similar to obsidian. It generally contains 65–75% $SiO_2$, 10–20% $Al_2O_3$, 2–5% $H_2O$, and smaller amounts of soda, potash, and lime. When perlite is heated to the softening point, it expands to form a light fluffy material similar to pumice. In one method of preparing the perlite for use in the present invention it is first ground to a size finer than minus 200 mesh. The ground perlite is then heated to a temperature of about 1500° F. This process is carried out in a perlite expander by heating the air to 1500° F. The finely ground perlite is then introduced into the heated air. As it is carried by the air, it is heated and pops like popcorn. Expanded perlite, is a very lightweight material. However, it contains many fine cracks and fissures, and, when placed in contact with water, the water penetrates the cracks and fissures and enters into the air filled cavities of the perlite, thereby greatly increasing the weight of the particles. Consequently, before utilizing expanded perlite in making joint compounds, it must first be treated to render it water-insensitive. This may be done in one of several different ways. The preferred method is to treat the expanded perlite with a silicone compound which prevents water penetration of the cracks and fissures.

In U.S. Pat. No. 4,454,267, the silicone material utilized to treat expanded perlite is a polydimethylsiloxane. However, because the material is so water-repellent, it was sometimes difficult to obtain a good bond between the joint compound containing treated perlite and the paper tape utilized to form the joint. Moreover, it was found that because of the silicone coating utilized, it was difficult to obtain a uniform gloss over the area of the painted joint compound and the painted gypsum board paper. In order to avoid these difficulties, the present invention utilizes an expanded perlite which is treated with an aminofunctional siloxane or silicone polymer, which may be formed as a mixture or copolymer of an aminosilane and an alkyl-substituted silane such as a methyl containing silane. Additionally, a silicone wetting agent is utilized which results in uniformity in the painted surface of the joint compound and the painted surface of the paper cover sheets of the wallboard.

EXAMPLES 1-14

In Examples 1-14, the results of which are shown in Table III below, tests were made to measure the bonding properties of joint compounds prepared with expanded perlite coated with aminosiloxanes according to the invention, compared to commercial expanded and coated perlite. In preparing the materials used in the tests of Examples 1-14, the results of which are shown in Table III, perlite was first placed in an expander and treated as described above. The resulting expanded perlite was then tumbled in a cement mixer and the applicable silicone solution applied with an airless sprayer. The perlite was first tumble dried with a heat lamp to prevent lumping, and later heat cured in an oven. The perlite was then compounded in a conventional joint compound formulation, as described in U.S. Pat. No. 4,454,267, and shown in Table I, and then subjected to conventional testing for bond to paper and paper tape.

TABLE III

| | | BOND TO PAPER TAPE COMPARISON | | | | | | |
|---|---|---|---|---|---|---|---|---|
| Example | Percent | Coating | Percent | Coating | 75/50 Bonds | Cold Bonds | Redry Bonds | Percent Binder |
| 1 | | HP-510 | | | 4.6 | 1.4 | 2.8 | 7.5 |
| 2 | 0.49 | ALE-56 | | | 5.7 | 1.0 | 3.0 | 5.5 |
| 3 | 0.60 | ALE-75 | | | 5.7 | 1.5 | 3.3 | 5.5 |
| 4 | 0.60 | ALE-75 | 0.23 | L-77 | 5.8 | 1.0 | 4.3 | 5.5 |
| 5 | 0.10 | ALE-75 | 0.10 | L-77 | 5.0 | 1.0 | 1.5 | 5.5 |
| 6 | 0.50 | ALE-75 | 0.25 | EPS | 4.7 | 1.0 | 2.0 | 5.5 |
| 7 | 0.55 | DC-108 | | | 6.0 | 1.5 | 4.3 | 5.5 |
| 8 | 0.23 | DC-108 | 0.10 | X-25146 | 5.0 | 0.5 | 1.7 | 5.5 |
| 9 | 0.23 | DC-108 | 0.09 | X-25150 | 5.0 | 1.0 | 2.5 | 5.5 |
| 10 | 0.22 | DC-108 | 0.10 | X-25139 | 4.0 | 1.0 | 2.0 | 5.5 |
| 11 | 0.28 | Q2-7224 | | | 4.5 | 1.0 | 2.0 | 5.5 |
| 12 | 0.26 | Q2-7224 | 0.11 | X-25139 | 4.2 | 0.5 | 1.3 | 5.5 |
| 13 | 0.26 | Q2-7224 | 0.11 | X-25150 | 4.2 | 1.0 | 1.5 | 5.5 |
| 14 | 0.25 | Q2-7224 | 0.10 | X-25146 | 3.7 | 1.0 | 1.7 | 5.5 |

In preparing for the bond test, paper tape was embedded in wet joint compound on gypsum wallboard. First a layer of joint compound was applied to the gypsum wallboard. Then the paper tape was laid over the joint compound and embedded with a board knife. Then, additional joint compound was applied on top and made smooth.

Bond to paper tape was then measured by estimating the amount of delaminated paper left on the joint compound after making a 5" "X" cut in a section of bonded tape, and then peeling the tape from the joint compound. Bond values of "0" to "7" were assigned depending on how much delaminated paper tape remained bonded to the joint compound. A 5" joint compound section completely covered with delaminated tape was assigned a "7" bond value, and a section showing no paper tape was given a "0" bond rating.

Bonds labeled 75/50 were dried at 75° F. and 50% relative humidity for both one day and one week. Cold bonds were dried at 40° F. and 80% relative humidity for a week. Redried bonds were cold bonds redried in 75/50 conditions for one day. The 75/50 values are an average for one bond dried for one day and two for one week, and cold bond values are from one bond cut. Redried values represent an average of two cuts.

In reviewing the results of the tests above, it appears that the HP-510, which is the prior art silicone compound coated perlite, had a poorer bond value of 4.6 than those utilizing the aminosiloxane coated perlite of the present invention. Additionally, it was necessary to use 7.5% binder even to achieve the low value. On the other hand, the materials of the present invention gave good bond even when the percentage of binder was reduced to 5.5%. Additionally the results show that the presence or absence of the silicone wetting agent did not affect the bonding properties conferred by the aminosiloxane materials either favorably or unfavorably.

EXAMPLES 15-27

Examples 15-27 contain the results of tests were made to measure the gloss uniformity of paint applied to the joint compound compared to paint applied to the paper cover sheets of the gypsum wallboard. To evaluate uniformity in paintability, joint compound strips were applied on a 4'×4' sheet of gypsum wallboard using an Ames box manufactured by Ames Taping Tools, Belmont, California. After the joint compound had dried, the entire board was roller painted with one coat of a white semi-gloss paint. Several brands were utilized, but most of the gloss comparisons were made using Sears Easy Living Paint. Measurements were taken at 85° (low angle sheen) using a Gardner glossmeter. The percent gloss values were calculated to compare the gloss over the joint to the gloss over the board paper. The determined gloss values are listed in Table IV below.

TABLE IV

| | GLOSS UNIFORMITY EVALUATION | | | | |
|---|---|---|---|---|---|
| Example | Percent | Coating | Percent | Coating | Percent 85° Gloss |
| 15 | 0.56 | DC-347 | | | 8.0 |
| 16 | 0.26 | ALE-56 | | | 21.0 |
| 17 | 0.26 | ALE-56 | 0.11 | L-77 | 23.0 |
| 18 | 0.25 | ALE-75 | | | 23.5 |
| 19 | 0.05 | ALE-75 | 0.05 | L-77 | 29.8 |
| 20 | 0.10 | ALE-75 | 0.10 | L-77 | 32.4 |
| 21 | 0.28 | ALE-75 | 0.22 | L-77 | 29.5 |
| 22 | 0.27 | ALE-75 | 0.44 | L-77 | 29.9 |
| 23 | 0.50 | ALE-75 | 0.25 | EPS | 33.9 |
| 24 | 0.26 | DC-108 | | | 22.1 |
| 25 | 0.22 | DC-108 | 0.10 | X-25139 | 20.2 |
| 26 | 0.28 | Q2-7224 | | | 14.2 |
| 27 | 0.23 | Q2-7224 | 0.10 | X-25150 | 30.4 |

The results shown in Table IV indicate in Example 15 that the use of perlite coated with DC-347, a polydimethylsiloxane emulsion, gave a very poor gloss result of 8.0. The best gloss results were obtained by coating perlite with mixtures of ALE-75 and L-77 in various proportions. The use of DC-108 and DC-108 together with X-25139 gave somewhat poorer results, but results which were still better than the prior art composition. Improved paintability properties were also shown by the combination in Example 27 of Q2-7224 together with X-25150. In Example 23 the ALE-75 and EPS were applied separately, in contrast to the case of the other materials where the two materials were first combined and then applied together to the perlite.

The materials listed above in Tables III and IV have the following compositions:

UCARS® Silicone - ALE-56. This trademarked material is a cationic, oil-in-water emulsion containing 35% by weight of a reactive amino-functional silicone polymer. The material is provided as an emulsion containing 35% by weight of reactive silicone polymer. The material is manufactured and marketed by Union Carbide Company.

UCAR® Silicone - ALE-75. This is a non-ionic, 60% active, oil-in-water emulsion containing a blend of dimethylsilicone and reactive amino-functional silicone co-polymers. The material is manufactured and marketed by Union Carbide Corporation.

DC-108. This is an aminosiloxane emulsion. The silicone chain contains methoxy functionality and amino functionality.

The material is manufactured and marketed by Dow-Corning.

Q2-7224. This material is a 35% non-ionic emulsion of an amino-functional silicone polymer, having the following structural formula:

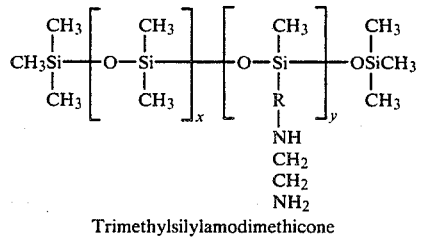

Trimethylsilylamodimethicone

This material is given the name trimethylsilylamodirethicone, and is manufactured and marketed by Dow-Corning.

EPS is an epoxysilicone marketed as UCARSIL EPS® by Union Carbide.

SILWET® L-77 is one of a group of surface active copolymers which are polyalkylene oxide modified polydimethylsiloxanes. Like most surface active materials, they contain discrete hydrophilic and hydrophobic segments. These products have the general formula:

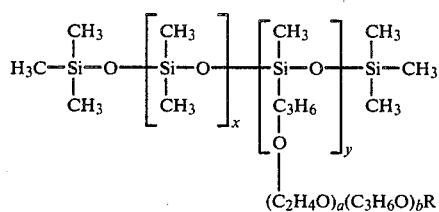

in which "R" can be either hydrogen or a lower alkyl radical. They contain Si-O-C bonds. Their general formula is:

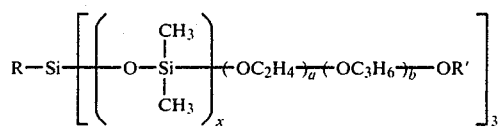

where "R" and "R'" are lower alkyls.

By varying the ratio and distribution of the segments, unique properties and performance are achieved which are not possible with conventional organic surfactants. This product is manufactured and sold by Union Carbide.

X-25139, X-25146 and X-25150 are also silicone wetting agents.

In the examples above the coating material for the perlite was an amino-functional siloxane, also termed an aminosiloxane. Instead of utilizing a commercial aminosiloxane material for coating perlite, a coating material may be formed from individual ingredients, by mixing together an alkyl group-containing silane and an aminosilane. Silanes are individual monomers which can be hydrolyzed and polymerized to form siloxanes, that is, silicone polymers. When such materials are combined, the alkyl group-containing silanes produce the hydrophobic coating properties, while the added amino silanes improve bond. Among the alkyl group-containing silanes utilized are methyltrimethoxysilane. The various amino-functional silanes utilized may be gamma-aminopropyltriethoxysilane, N-beta-aminoethyl-gamma aminopropyltrimethoxysilane and gamma-aminopropylmethyldiethoxysilane. Utilizing a mixture of methyltrimethoxysilane with one of the amino-functional silanes provides a perlite coating which gives excellent bond properties to joint compounds prepared therefrom. Measured gloss uniformity was also improved.

In Table V below are shown examples in which the coating compositions were formed from mixtures of an alkyl group-containing silane and an aminosilane. The coated perlite was then utilized to make joint compounds according to the method described above. Bonding and paint coating uniformity were then tested according to the methods described above.

TABLE V

| | PERCENT BY WEIGHT BASED ON PERLITE | | | |
|---|---|---|---|---|
| | Percent on Perlite: | | Molar Ratio of | 75/50 |
| Example | A-1100 | MTMS | A-1100 to MTMS | Bonds |
| 28 | 0.19% | 0.39% | 1:9 | 4.5 |
| 29 | 0.56% | 0.12% | 1:3 | 4.3 |
| 30 | 0.08% | 0.48% | 1:1 | 2.7 |
| 31 | 0.40% | 0.28% | 3:1 | 3.5 |

In arriving at the bond values shown, each figure is the average of 3 values, utilizing a 5.5% polyvinyl acetate binder concentration. The method used for Examples 28–31 in which two silanes are mixed to form a mixture which results in the equivalent of an aminosiloxane, is useful in that it can be tailored with respect to percentages of each compound in order to obtain or modify the properties in a suitable manner. Table VI below contains information as to the composition of the materials used in Examples 28–31.

TABLE VI

METHYL AND AMINO-FUNCTIONAL SILANES USED TO COAT PERLITE

| Commercial Name | Chemical Name | Supplier(s) |
| --- | --- | --- |
| A-1100 | Gamma-Aminopropyltriethoxysilane | Union Carbide |
| MTMS | Methyltrimethoxysilane | Kay-Fries |

It was found that the compositions of Examples 28–31 provided coated perlite which, when used in standard joint compounds as disclosed, form products which have excellent bond-to-tape and bond-to-paper cover sheet properties with 2% less binder than required for conventional silicone resin-coated perlite.

The amino-functional silicone or aminosiloxane should be used in an amount of from 0.5% to about 5%, based on perlite, dry weight. An optimum amount is about 0.15%.

The silicone wetting agent should be used in an amount of from about 0.025% to 2.5% based on perlite, dry weight. An optimum value is about 0.05%.

The lightweight joint compound of the present invention has many advantages over joint compounds disclosed in the prior art. One advantage is that the material is lighter in weight than conventional joint compounds. Consequently, transportation costs are less. Additionally, because of its light weight, the joint compound can be carried around more easily in buckets, on a trowel or a bazooka, and worked with more easily by workmen. When the material of the present invention is utilized, at the end of an eight hour day the workmen are considerably less tired. After the joint compound has been applied and dried, it is much easier to sand than conventional joint compounds. After sanding, a smooth finished wall is obtained. The present joint compound also has a great advantage over conventional joint compounds in that it is lower in shrinkage. Because of this property, it is not necessary to utilize talc or mica, common ingredients utilized in conventional joint compound to prevent cracking. The present joint compound also has very good application properties, generally better than those of conventional joint compounds.

The present joint compound has improved bonding properties in relation to paper tape and wallboard paper cover sheets. Moreover, joint compounds made with the present coated perlite provide more gloss uniformity between areas of joint compound and areas of paper covering.

It is to be understood that the invention is not to be limited to the exact details of operation or materials described, as obvious modifications and equivalents will be apparent to one skilled in the art.

Invention is claimed as follows:

1. Expanded perlite which has been treated with an amino-functional silicone compound to render it water-insensitive while still providing good bonding properties to a joint compound into which it is formulated.

2. A treated expanded perlite according to claim 1, wherein said amino-functional silicone compound is an aminosiloxane.

3. An expanded perlite compound according to claim 1, wherein said amino-functional silicone compound is formed from a mixture of an alkyl group-containing silane and an aminosilane.

4. An expanded perlite according to claim 1, additionally treated with a silicone wetting agent, thereby improving painting uniformity of a joint compound into which it is formulated.

5. A lightweight joint compound having properties suitable for use in finishing joints between the edges of adjacent wallboards, and having improved bonding to paper tape and paper cover sheets provided on said wallboard, said joint compound comprising:
   (1) a filler selected from the group consisting of calcium carbonate and calcium sulfate,
   (2) a non-leveling agent,
   (3) expanded perlite which has been treated with an amino-functional silicone compound to render said perlite water-insensitive and improving the joint compound to paper bond, said perlite being present in an amount of from about 3.5% to about 25% based on the dry weight of said joint compound,
   (4) a thickener,
   (5) a binder, and
   (6) sufficient water to adjust the viscosity to render said joint compound suitable for use.

6. A joint compound according to claim 5, wherein said aminofunctional silicone compound is an aminosiloxane.

7. A joint compound according to claim 5, wherein said aminofunctional silicone compound is formed from a mixture of an alkyl group-containing silane and an aminosilane.

8. A joint compound according to claim 5, additionally treated with a silicone wetting agent, thereby improving painting uniformity of a joint compound in which it is incorporated.

9. A lightweight joint compound according to claim 8, wherein said filler is present in an amount from about 38% to about 93% by dry weight of said joint compound.

10. A lightweight joint compound according to claim 8, wherein said filler is calcium carbonate.

11. A lightweight joint compound according to claim 8, wherein said filler is calcium sulfate.

12. A lightweight joint compound according to claim 8, wherein said non-leveling agent is present in an amount of from about 0.5% to about 7% by dry weight of said joint compound.

13. A lightweight joint compound according to claim 8, wherein said non-leveling agent is attapulgus clay.

14. A lightweight joint compound according to claim 8, wherein said non-leveling agent is a mixture of a clay and amylopectin starch in a ratio by weight of about 1:5.

15. A lightweight joint compound according to claim 8, wherein said binder is present in an amount of from about 0.5% to about 10% by dry weight of said joint compound.

16. A lightweight joint compound according to claim 8, wherein said binder is polyvinyl acetate.

17. A lightweight joint compound according to claim 8, wherein said thickener is present in an amount of from about 0.5% to about 1.8%.

18. A lightweight joint compound according to claim 8, wherein said thickener is hydroxypropyl methylcellulose.

19. A lightweight joint compound according to claim 8, wherein said thickener is hydroxyethylcellulose.

20. A lightweight joint compound according to claim 8, which is substantially free of mica.

* * * * *